Dec. 26, 1961     H. I. GREEN     3,014,345
EQUALIZED HYDRAULIC LIFT
Filed Oct. 17, 1957
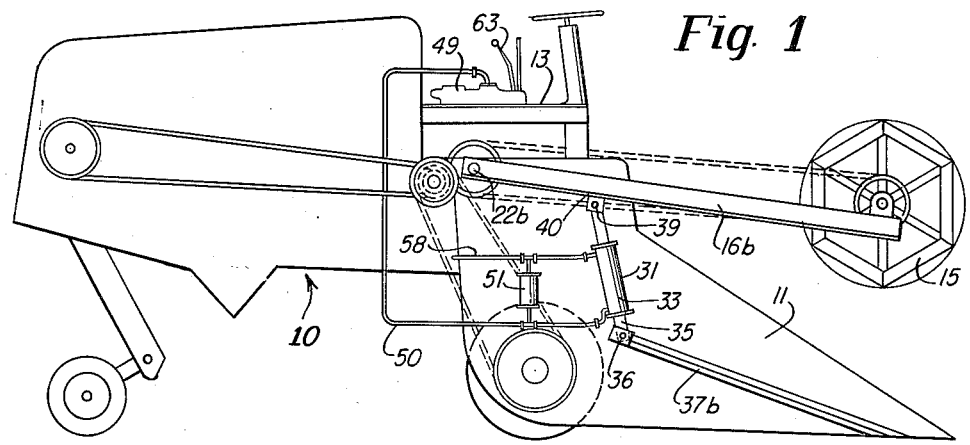
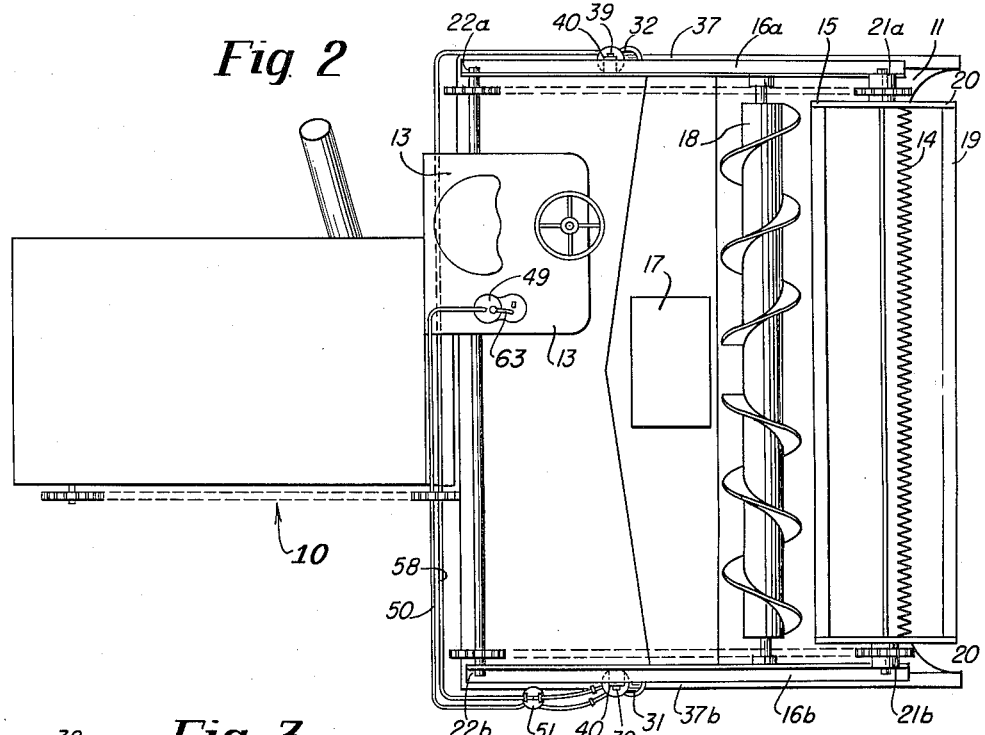
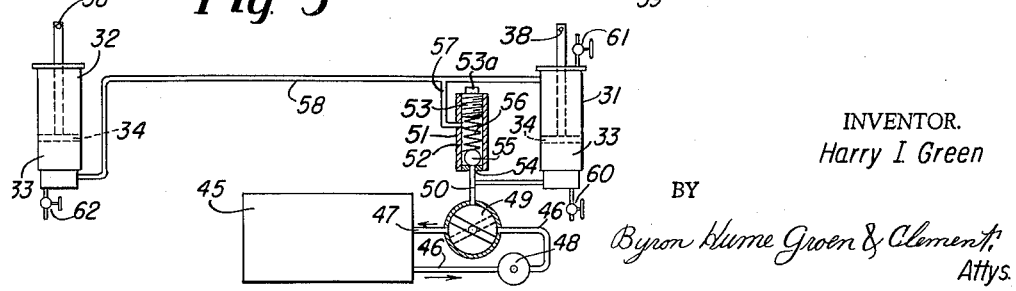
INVENTOR.
Harry I. Green
BY
Byron Hume Groen & Clement,
Attys.

United States Patent Office 3,014,345
Patented Dec. 26, 1961

3,014,345
EQUALIZED HYDRAULIC LIFT
Harry I. Green, 401 Lakelawn Ave., Aurora, Ill.
Filed Oct. 17, 1957, Ser. No. 690,742
2 Claims. (Cl. 60—97)

The present invention relates to hydraulic lift systems including a plurality of hydraulic lift jacks.

It is an object of the present invention to provide a simple and improved hydraulic lift system that is easy to install and easy to maintain.

A further object of the invention is to provide an improved hydraulic lift system of the plural type wherein the lift jacks are adapted to work in unison for raising or lowering supported objects equal distances.

Another object of the invention is to provide an improved hydraulic lift system of the plural type wherein the lift jacks are operated in unison in spite of any defect or fault that may occur in any jack or in the hydraulic conduits connecting the jacks.

A specific object of the invention is to provide an improved hydraulic lift system of the dual type including a double acting hydraulic jack and a single acting hydraulic jack connected in series to a source of hydraulic fluid, wherein an adjustable pressure release valve is provided between the source of the hydraulic fluid and the single acting hydraulic jack for maintaining the fluid pressure in the system equalized at all times.

The invention is applicable to a wide variety of lift machinery and is particularly well adapted for use with harvesting machinery provided with a sickle knife and a power driven bat reel for guiding and supporting the grain into the area of the sickle knife. In order to harvest a field efficiently with a minimum of grain loss per acre it is necessary that the reel be adjusted to an optimum height from the ground, neither so low as to crush and flatten the grain and thereby permit the harvester to run over it, nor so high as to be useless in guiding the grain into the area of the sickle knife. Most harvester machines are built with adjustable height reels and the height to which the reel is adjusted depends upon the type of grain being harvested, the density of the grain, the height of the grain, and the lay of the grain field, among other factors. In a given field of grain any one or all of these factors may vary so that in order to do a proper job of harvesting with the least "sickle loss" it is necessary to constantly adjust the reel to the optimum height. It is appreciated that when this adjustment is performed manually, which requires stopping the harvesting operation, the result is that either a considerable amount of down time of the harvester is experienced in maintaining the reel at optimum setting or a medium setting of the reel is made which creates considerable grain loss per acre, neither of which is desirable.

The hydraulic lift system of the present invention overcomes these stated difficulties and is to be preferred over other systems in that it is compatible with mechanical adjusting systems and is simple to install and to maintain.

The invention, both as to its object and features, will be better understood by reference to the following specification and drawings, forming a part thereof, wherein:

FIGURE 1 is a side elevational view of a harvester including the hydraulic lift system in accordance with the invention;

FIGURE 2 is a top plan view of a harvester including the hydraulic lift system in accordance with the invention; and FIGURE 3 shows in schematic form the hydraulic system in accordance with the invention.

Referring to the drawings, there is shown in FIGURES 1 and 2 a harvester machine 10 including harvesting apparatus 11 and an operator's platform 13 from which the harvester-thresher is operated and controlled.

The harvester apparatus 11 includes a sickle bar 14 operative for cutting the grain, a bat reel 15 supported from the harvester frame by means of support arm 16a and 16b, a conveyor 17 for carrying the cut grain into the thresher section of the machine 10, and an auger 18 for feeding the grain cut by the sickle bar 14 to the conveyor 17.

The reel 15 is made up of a plurality of bats 19 arranged in cylindriform, and carried between two end discs or frames 20. The reel 15 is supported at the end frames 20 by stub shafts 21a and 21b for rotation about its longitudinal axis. The stub axes 21a and 21b are each journaled into one end of the corresponding arm members 16a and 16b. The other end of each arm member 16a and 16b is pivotally supported on the harvester frame by pivot pins 22a and 22b, whereby the reel 15 may be raised and lowered to an adjustable height above the sickle bar 14.

In accordance with the invention the reel 15 may be moved vertically to adjust the reel in different horizontal planes by means of a hydraulic system including two hydraulic jacks 31 and 32. The hydraulic jack 31 is of the double acting type and the hydraulic jack 32 is of the single acting type though substantially identical in other structural details, each including a cylinder 33 and a piston 34. The base of each cylinder is provided with a pivot lug 35 to receive a pivot pin 36 by means of which the cylinder is fixed to a corresponding one of two channel members 37a and 37b forming a part of the harvester frame.

The piston shaft of each jack includes a pivot hole 38 for receiving a pivot pin 39 by means of which the piston is connected to a pivot lug 40 on an intermediate portion of the corresponding one of the support arms 16a and 16b. From this arrangement it is evident that as the pistons 34 of the jacks 31 and 32 reciprocate within their cylinders, the support arms 16a and 16b will be swung upwardly and downwardly about the corresponding pivot points 22a and 22b and will correspondingly raise and lower the reel 15.

Considering now the system for operating the hydraulic jacks 31 and 32, and referring specifically to FIGURE 3, it is noted that the diameter of the cylinder 33 associated with the jack 32 is less than the diameter of the cylinder associated with the jack 31. This structure is occasioned by the fact that the hydraulic jack 32 is operated in series with the hydraulic jack 31 and it is necessary that for equalized displacement of the piston in the two hydraulic jacks that the maximum volume of the chamber below the piston in the hydraulic jack 32 should be equal to the maximum volume of the chamber above the piston in the hydraulic jack 31.

The system is provided with hydraulic fluid from a reservoir 45 including an outlet conduit 46 and an inlet conduit 47. The outlet conduit 46 is connected through a suitable pump 48 for controlling the hydraulic fluid pressure in the system to a selector valve 49. The selector valve 49 is also connected to the inlet conduit 47 extending to the reservoir 45 and is connected to a conduit 50 extending to the hydraulic jack 31 and to a pressure release valve 51. The selector valve 49 is arranged so that in one valve position a hydraulic flow path is completed between the conduit 46 and the conduit 50 and in another valve position, indicated by the dotted lines in FIGURE 3, a hydraulic flow path is completed between the conduit 50 and the inlet conduit 47. The pressure release valve 51 is made up of a cylinder 52 threaded and plugged at one end by means of a plug 53 and including at its other end a ball valve seat 54 connected to the conduit 50. In addition the valve 51 includes a ball valve 55 positioned in the seat 54 and a spring 56 in compression between the plug 53 and the ball valve 55. The plug 53 of the sequence valve is provided with a projection 53a by which the plug may be turned for adjustment. A conduit 57 is connected to the cylinder 52 and to a conduit 58 extending between the upper chamber of the cylinder of the hydraulic jack 31 and the lower chamber of the cylinder of the hydraulic jack 32. The hydraulic jack 31 includes a bleed valve 60 connected to the lower chamber of the cylinder 33 and a bleed valve 61 connected to the upper chamber of the cylinder 33, and the hydraulic jack 32 includes a bleed valve 62 connected to the lower chamber of the cylinder 33. These bleed valves are for the purpose of releasing from the system any air that might have been trapped therein by the flow of hydraulic fluid.

From the foregoing description of the system it is appreciated that the valve 51 is connected in parallel with the hydraulic jack 31 between the conduit 50 extending to the lower chamber of the hydraulic jack 31 and the conduit 58 extending from the upper portion of the jack 31. The selector valve 49, as shown in FIGS. 1 and 2 is positioned on the operator's platform 13 and includes a lever arm 63 for controlling the positions of the selector valve. The hydraulic lift system may be connected directly to the hydraulic system of the harvester machinery if such a system is provided in the machine or a hydraulic fluid reservoir 45 and a suitable pump 48 may be separately installed.

*Operation*

Considering now the operation of the hydraulic lift system in accordance with the invention, assuming the selector valve 49 in the position shown in FIGURE 3, hydraulic fluid from the reservoir 45 is applied through the pump 48 at a selected pressure to the conduit 46 and through the selector valve 49 through the conduit 50 extending to the lower chamber of the hydraulic jack 31. The hydraulic pressure in the system is assumed to be sufficient to overcome the forces supported by the piston 34 so that initially the piston 34 of the hydraulic jack 31 is extended to maximum stroke. Preferably the piston 34 of the hydraulic jack 31 in the extended position blocks the port connected to the conduit 58 extending to the hydraulic jack 32 although this is not a necessary requirement for operation of the system. The compressive forces on the spring 56 of the pressure valve 51 is adjustable by means of the threaded plug 53 and it is preferably adjusted to be equal to the forces supported by the piston 34 of the hydraulic jacks 31 and 32. Accordingly, during the initial extending stroke of the piston 34 in the hydraulic jack 31, the ball valve 55 remains positioned on its seat 54 in the valve 51 so that no fluid flows therethrough to the hydraulic jack 32. However, as soon as the piston in the hydraulic jack 31 is in its full extended position hydraulic pressure buids up against the ball 55 and unseats it thereby permitting a flow of hydraulic fluid through the valve 51, the conduit 57, and the conduit 58 into the lower chamber of the hydraulic jack 32. Accordingly, the piston 34 of the hydraulic jacks 32 is extended to maximum stroke.

At this time then the support arms 16a and 16b are raised and the reel 15 is supported at its maximum height. To use the system it is then necessary only to adjust the reel 15 to the optimum height for cutting grain and to bleed the hydraulic lift system of any trapped air or gases.

In order to lower the reel 15 to desired height, the selector valve 49 is moved to a position such as that shown by the dotted lines in FIGURE 3. The weight of the reel 15 on the piston 34 of the hydraulic jacks 31 and 32 cause hydraulic fluid to be forced from the lower chamber of the hydraulic jack 31 through the conduit 50, the selector valve 49 and the inlet conduit 47 to the reservoir 45. At the same time hydraulic fluid from the lower chamber of the hydraulic jack 32 is forced through the conduit 58 into the upper chamber of the hydraulic jack 31. Unless the selector valve 49 is controlled further, the pistons 34 will be completely collapsed into the cylinders 33 of the hydraulic jacks 31 and 32. It is preferred that the pistons 34 be stopped at some intermediate position within the cylinders 33 by closing the selector valve 49 to a neutral position in order to prevent any flow of hydraulic fluid in either direction through the conduit 50. At this point the bleed valves 60, 61 and 62 may be operated to release any trapped gases in the system and the selector valve 49 may thereafter be operated in the manner as previously explained to either extend or retract the pistons 34 of the hydraulic jacks 31 and 32.

It is appreciated that the lower chamber of the hydraulic jack 32 and the upper chamber of the hydraulic jack 31 joined by the conduit 58 define a closed hydraulic chamber and the hydraulic fluid therein, being substantially incompressible, causes the piston 34 in the jack 32 to move in accordance with movement of the piston 34 in the jack 31. Thus, if it is desired to extend the pistons 34 to maximum stroke it is merely necessary to apply hydraulic fluid at a high pressure to the lower chamber of the hydraulic jack 31 and in order to collapse the pistons 34 into the cylinders 33 it is merely necessary to relieve the pressure applied against the lower face of the piston 34 in the hydraulic jack 31.

The pressure release valve 51, in addition to filling the closed chamber with hydraulic fluid maintains the fluid supply in the closed chamber in spite of any minor fault or leak therein. For example, should the conduit 58 develop a hydraulic leak, the pressure within the closed chamber will gradually diminish and become less than that in the lower chamber of the hydraulic jack 31 so that the ball valve 55 will become unseated and permit a flow of hydraulic fluid into the closed chamber equalized to the leak flow. Accordingly, fluid pressure is maintained in the closed chamber. This feature is particularly desirable in that if the leak is minor in nature such as to require attention but not immediate attention or repair, it is possible to utilize the equipment on which the hydraulic lift system is arranged until the need for the equipment is exhausted and then repair the leak. It will be appreciated that in a farm usage such a feature is particularly important in that during harvesting time the need for such equipment is continuous and any delays or down times are very expensive and can mean the loss of a crop.

In view of the foregoing description, it is clear that there has been provided herewith an improved hydraulic lift system of the dual type which is simple, convenient and easy to install, maintain and operate. Though the hydraulic lift system has been described in terms of two hydraulic jacks, it is clear that the principles are applicable to two or more hydraulic jacks. Additionally, in the use described herein, the diameter of the cylinder 33 of the hydraulic jack 32 was described as being smaller than the diameter of the cylinder in the hydraulic jack 31 and it is appreciated that for some usages where an equalized stroke between the pistons is not preferred, other relationships between the diameters of the two cylinders may be preferred.

While the embodiment of the hydraulic lift system in accordance with the invention described herein, is at present considered to be preferred, it is appreciated that variations and modifications may be made therein, and it is intended to cover in the appended claims all such modifications and variations as fall within the true spirit and scope of the invention.

What is claimed is:

1. Hydraulic lift apparatus comprising spaced apart single and double acting hydraulic jack means adapted to be mounted on a field implement having a field tool to accept unbalanced loads associated with the implement;

a first work arm pivoted at one end to the implement and bearing one end of the field tool at the other end and supported intermediate its ends by said single acting jack means; a second work arm disposed generally parallel to and spaced apart from said first work arm, said second work arm being supported at one end on the implement and bearing the opposite end of the field tool at the other end and supported intermediate its ends by said double acting jack means, conduit means traversing the space between said jack means and connecting the same, said double acting hydraulic jack means including a piston slidably received in a cylinder to define a first work chamber on one side of said piston and an annular hydraulic chamber on the opposite side of said piston with the expansion of said first work chamber being associated with corresponding contraction of the annular hydraulic chamber and with movement of said piston against a load, said single acting hydraulic jack means being hydraulically slaved to said double acting hydraulic jack means through said conduit means and including a second piston slidably received in a cylinder to define a second work chamber with the expansion thereof being associated with movement of said second piston against a load, said conduit means connecting the second work chamber to said annular hydraulic chamber, a normally closed and adjustable spring biased relief valve means accessible exteriorly of said jack means for independent and selective operation of said single acting jack means whereby to adjust the position of said first work arm relative to said second work arm, said valve means being connected between said first work chamber and said annular hydraulic chamber through said conduit means to regulate hydraulic flow from the first work chamber to the annular hydraulic chamber and to said second work chamber, the bias of said valve means being adjusted to be at least equal to said load for assuring equal travel of said pistons; and hydraulic pressure generating means selectively connectible with said first work chamber.

2. Hydraulic lift apparatus as claimed in claim 1, wherein the hydraulic pressure generating means is connected to said first work chamber through second conduit means upon communicating with said relief valve means and including therein a selector valve for applying pressure to said first work chamber.

References Cited in the file of this patent

UNITED STATES PATENTS

| | | |
|---|---|---|
| 700,162 | Wiley | May 13, 1902 |
| 1,692,034 | Griffin | Nov. 20, 1928 |
| 1,944,351 | Landry | Jan. 23, 1934 |
| 2,100,445 | Le Bleu | Nov. 30, 1937 |
| 2,112,466 | Maloon | Mar. 29, 1938 |
| 2,361,326 | Silver | Oct. 24, 1944 |
| 2,410,978 | Kelly | Nov. 12, 1946 |
| 2,462,580 | Watson | Feb. 22, 1949 |
| 2,499,563 | Bill | Mar. 7, 1950 |
| 2,891,765 | Pearne | June 23, 1959 |

FOREIGN PATENTS

| | | |
|---|---|---|
| 589,464 | Great Britain | June 20, 1947 |